United States Patent

[11] 3,586,993

[72] Inventor William Alex Buck
Englewood, N.J.
[21] Appl. No. 848,864
[22] Filed Aug. 11, 1969
[45] Patented June 22, 1971
[73] Assignee Marconi Instruments Limited
London, England
[32] Priority Aug. 14, 1968
[33] Great Britain
[31] 38861/68

[54] TESTING INSTRUMENTS FOR TELECOMMUNICATION SYSTEMS
2 Claims, 2 Drawing Figs.

[52] U.S. Cl. 331/78, 179/1 P;15 BF;175.2 R
[51] Int. Cl. H03b 29/00
[50] Field of Search 331/78
179/1, 15, 175

*Primary Examiner*—John Kominski
*Attorney*—Baldwin, Wight, Diller & Brown

ABSTRACT: In a "while noise" test set a mixer is fed from a source of white noise via a narrow band-stop filter and from a variable frequency oscillator, a predetermined band of frequencies from the output of the mixer being fed to a second mixer with oscillators from a fixed frequency oscillator. The arrangement is such that the output from the second oscillator consists of a noise frequency band including a narrow "silent slot," the position of which is variable over said band by varying the frequency of the variable frequency oscillator.

PATENTED JUN 22 1971 3,586,993

Figure 1:
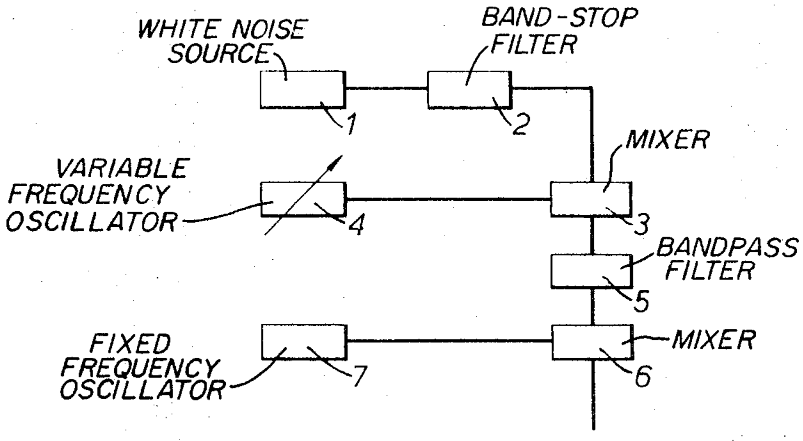

INVENTOR
William Alex Buck
BY
Baldwin Wight Diller & Brown
ATTORNEYS

TESTING INSTRUMENTS FOR TELECOMMUNICATION SYSTEMS

This invention relates to testing instruments suitable for testing telecommunication systems and more specifically to such testing instruments of the kind commonly known as, and herein termed, "white noise test sets."

A well-known method of testing a telecommunication system such, for example, as a so-called microwave link, is by sending over the system a wide noise band having a narrow "-silent slot" in it. In other words the noise signals sent over the system extend over a wide band except for a slot or narrow band of frequencies, occurring at a predetermined position in the wide band and over which there are, practically speaking, no signals transmitted. If, when such a slotted noise band is transmitted over the system signals are received in the narrow frequency band of the slot, these can only be caused by intermodulation or crosstalk in the system, it being, of course, the purpose of the test to check the system for intermodulation or crosstalk. The slotted noise band transmitted is in normal present day practice produced by a so-called white noise source followed by a narrow band-stop filter the stopband of which corresponds with the desired slot.

A known white noise test set of this nature capable of adequately testing a modern multichannel microwave link or similar communication system is an expensive and complicated instrument because of the large number of bandstop filters which must be provided. In a practical case there may have to be several dozen of such filters arranged for selectable insertion into the output circuit of the white noise source in order to be able to test for intermodulation or crosstalk at all the large number of narrow frequency channels lying within the overall operating frequency band of the system. Indeed, in the case of a system with a very large number of channels—and systems with up to 2700 channels exist—it is impracticable with such known test sets to provide adequate testing of all the channels.

The present invention seeks to overcome these difficulties and defects and to provide improved and relatively inexpensive white noise test sets capable of providing adequate testing of a telecommunication system with a large number of channels covering a wide range of frequencies.

According to this invention a white noise test set comprises a source of white noise; a narrow band bandstop filter fed with output from said source; a first mixer having one input fed with output from said band-stop filter and another input fed with output from a variable frequency oscillator which is variable over a predetermined frequency range; and a second mixer having an input fed with a predetermined band of frequencies selected from the output of the first mixer and another input fed with oscillations from a fixed frequency oscillator, the frequency range of the variable frequency oscillator, the frequency of the fixed frequency oscillator and the band selected from the output of the first mixer being so chosen that the output from the second mixer consists of a noise frequency band extending up to a predetermined upper frequency and including a narrow slot the position of which, within said band, is variable over said band by varying the frequency of the variable frequency oscillator.

In a preferred embodiment of the invention the variable frequency oscillator is variable over a frequency range extending upwards from a lower frequency limit equal to twice the highest useful frequency from the noise source; the band selected from the output of the first mixer is half the width of the band of useful frequencies from the noise source and extends upwards from a lower frequency limit equal to three halves of the highest useful frequency from said noise source; and the frequency of the fixed frequency oscillator is equal to the lower frequency limit of said selected band.

Figure 2:
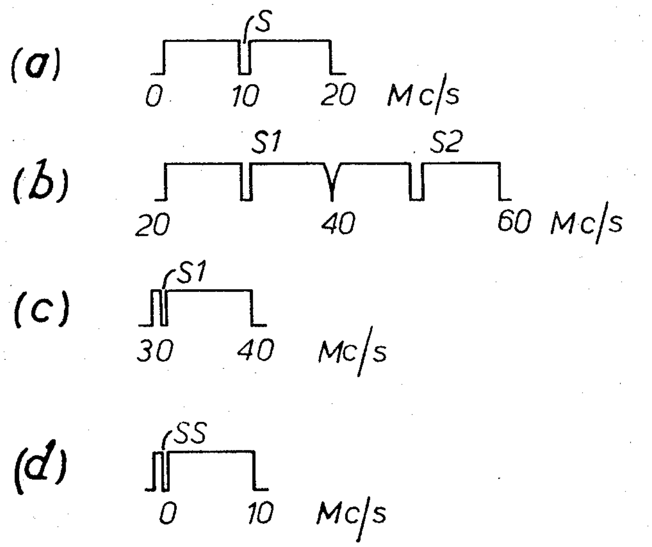

The invention is illustrated in the accompanying drawings in which FIG. 1 is a block diagram of a preferred embodiment and FIG. 2 is set of "idealized" frequency spectra showing the frequency spectra obtained at different parts of the circuit of FIG. 1. In describing the drawings practical values of frequencies will be given by way of example.

Referring to the drawings 1 is a white noise source of any suitable known kind adapted to provide noise signals extending over a range of 0 to 20 mc./sec. and 2 is a band-stop filter adapted in effect to "cut out" a slot centered on 10 mc./sec. Line (*a*) of FIG. 2 represents the spectrum at the output of the filter 2, S being the slot. The output from 2 is fed to a first mixer 3 to which is also fed the output from a variable frequency oscillator 4, which is variable over the range of 40 to 50 mc./sec. The output spectrum from mixer 3, when oscillator 4 is in one position of adjustment, is represented in line (*b*) of FIG. 2. As will be seen the slot S of line (*a*) of FIG 2 has given rise to two slots S1 S2 respectively in the lower and upper bands produced by the mixer 3. The mixer 3 feeds into a band pass filter 5 having a pass band of 30 to 40 mc./sec. Line (*c*) of FIG. 2 shows the spectrum at the output of filter 5. This output is fed to a second mixer 6 to which is also fed the output of a fixed frequency oscillator 7 generating a frequency of 30 mc./sec. The resultant output from the mixer 6 is represented in line (*d*) of FIG. 2. This output which is the useful output of the test set, extends, as will be seen, from 0 to 10 mc./sec. and has a slot S3 which can be moved to any desired position in the band of 0 to 10 mc./sec. by varying the frequency of the oscillator 4 over its 10 mc./sec. range of variation.

The performance of this test set depends very much on the quality of the two mixers employed but, by using modern diodes for these mixers, a 70 db. slot should be attainable without much difficulty.

I claim:

1. A so-called "white noise" test set comprising a source of white noise; a narrow band band-stop filter fed with output from said source; a first mixer having one input fed with output from said band-stop filter and another input fed with output from a variable frequency oscillator which is variable over a predetermined frequency range; and a second mixer having an input fed with predetermined band of frequencies selected from the output of the first mixer and another input fed with oscillations from a fixed frequency oscillator, the frequency range of the variable frequency oscillator, the frequency of the fixed frequency oscillator and the band selected from the output of the first mixer being so chosen that the output from the second mixer consists of a noise frequency band extending up to a predetermined upper frequency and including a narrow slot the position of which, within said band, is variable over said band by varying the frequency of the variable frequency oscillator.

2. A test set as claimed in claim 1 wherein the variable frequency oscillator is variable over a frequency range extending upwards from a lower frequency limit equal to twice the highest useful frequency from the noise source; the band selected from the output of the first mixer is half the width of the band of the useful frequencies from the noise source and extends upwards from a lower frequency limit equal to three-halves of the highest useful frequency from said noise source; and the frequency of the fixed frequency oscillator is equal to the lower frequency limit of said selected band.